US010042084B2

(12) United States Patent
Lin et al.

(10) Patent No.: US 10,042,084 B2
(45) Date of Patent: Aug. 7, 2018

(54) REFLECTIVE TYPE PIR MOTION DETECTION SYSTEM

(71) Applicant: Sercomm Corporation, Taipei (TW)

(72) Inventors: Shih-Mu Lin, Taipei (TW);
Kuang-Yong Huang, Taipei (TW)

(73) Assignee: Sercomm Corporation, Taipei (TW)

( * ) Notice: Subject to any disclaimer, the term of this patent is extended or adjusted under 35 U.S.C. 154(b) by 0 days.

(21) Appl. No.: 15/620,832

(22) Filed: Jun. 13, 2017

(65) Prior Publication Data
US 2018/0011218 A1 Jan. 11, 2018

(30) Foreign Application Priority Data

Jul. 7, 2016 (TW) .............................. 105210219 U

(51) Int. Cl.
*G01V 8/10* (2006.01)
*G01J 5/00* (2006.01)
*G01J 5/08* (2006.01)

(52) U.S. Cl.
CPC .............. *G01V 8/10* (2013.01); *G01J 5/0025* (2013.01); *G01J 5/0809* (2013.01)

(58) Field of Classification Search
CPC ......... G01V 8/10; G01J 5/0025; G01J 5/0809
See application file for complete search history.

(56) References Cited

U.S. PATENT DOCUMENTS

| 6,346,705 B1 | 2/2002 | Lee et al. |
| 6,348,691 B1 | 2/2002 | Sandell et al. |
| 7,265,670 B2 | 9/2007 | Pantus et al. |
| 2017/0167923 A1* | 6/2017 | Xu ........................ G01J 5/0809 |

OTHER PUBLICATIONS

Visonic Ltd., "Tower®-40MCW Premium Wireless Mirror PIR Detector," Tower-40MCW Data Sheet Eng C-800494 (Rev.00), Retrieved Jun. 9, 2017, pp. 1-2.

* cited by examiner

*Primary Examiner* — Hugh H Maupin
(74) *Attorney, Agent, or Firm* — JCIPRNET

(57) ABSTRACT

A reflective type passive infrared motion detection system includes a housing, a sensor element and a reflecting element. The sensor element is disposed on the housing. The reflecting element is disposed on the housing and has a plurality of reflecting tiers. Each reflecting tier has a plurality of reflecting curved surfaces, the reflecting curved surfaces are arranged along a first axial direction in sequence, and the reflecting tiers are arranged along a second axial direction in sequence. The reflecting curved surfaces respectively have different azimuth angles. An aperture width of each reflecting curved surface along a direction perpendicular to the second axial direction is positively correlated with a reciprocal of a cosine value of the corresponding azimuth angle. An aperture length of the reflecting curved surfaces of each tier along a direction of the second axial direction is positively correlated with square of a distance of the corresponding infrared source.

11 Claims, 5 Drawing Sheets

REFLECTIVE TYPE PIR MOTION DETECTION SYSTEM

CROSS-REFERENCE TO RELATED APPLICATION

This application claims the priority benefit of Taiwan application serial no. 105210219, filed on Jul. 7, 2016. The entirety of the above-mentioned patent application is hereby incorporated by reference herein and made a part of this specification.

BACKGROUND OF THE INVENTION

Field of the Invention

The invention relates to a passive infrared (PIR) motion detection system, and more particularly, to a reflective type PIR motion detection system.

Description of Related Art

Organisms such as humans with temperature about 25-40° C. emit infrared radiation having a wavelength of 8 μm to 12 μm. A passive infrared (PIR) detection system utilizes this phenomenon for sensing the infrared radiation emitted from organisms, so as to detect whether someone has entered a specific space. This kind of detection system may be applied to an automatic alarm security system to exert its automatic security monitoring function.

A reflective type PIR motion detection system uses a reflecting element to focus the infrared radiation emitted from organisms onto a sensor element. To enable the reflecting element to reflect the infrared radiation from various different positions in the specific space onto the sensor element, the reflecting element is required to have a plurality of reflecting tiers corresponding to the different positions. For example, U.S. Pat. No. 6,346,705 B1 discloses techniques related to the above-mentioned reflective type PIR motion detection system. However, it does not specifically teach how to make sensing signals generated by infrared radiation from far and near positions have similar strengths. Therefore, how to enable all the reflecting tiers to accurately and effectively focus the corresponding infrared radiation onto the sensor element and to make all the sensing signals have similar signal strengths is an important subject in geometric designs of reflecting surfaces of the reflecting element.

SUMMARY OF THE INVENTION

The invention provides a reflective type PIR motion detection system having good sensing capability.

A reflective type PIR motion detection system of the invention includes a housing, a sensor element and a reflecting element. The sensor element is disposed on the housing. The reflecting element is disposed on the housing and has a plurality of reflecting tiers. Each reflecting tier has a plurality of reflecting curved surfaces, the reflecting curved surfaces are arranged along a first axial direction in sequence, and the reflecting tiers are arranged along a second axial direction in sequence. The reflecting curved surfaces respectively have different azimuth angles relative to a third axial direction and are adapted to respectively reflect infrared rays from different sensed positions onto the sensor element. An aperture width of each reflecting curved surface along a direction perpendicular to the second axial direction is positively correlated with a reciprocal of a cosine value of the corresponding azimuth angle.

A reflective type PIR motion detection system of the invention includes a housing, a sensor element and a reflecting element. The sensor element is disposed on the housing. The reflecting element is disposed on the housing and has a plurality of reflecting tiers. Each reflecting tier has a plurality of reflecting curved surfaces, the reflecting curved surfaces are arranged along a first axial direction in sequence, and the reflecting tiers are arranged along a second axial direction in sequence. The reflecting curved surfaces respectively have different azimuth angles relative to a third axial direction and are adapted to respectively reflect infrared rays from different sensed positions onto the sensor element. An aperture length of each reflecting curved surface along a direction perpendicular to the first axial direction is positively correlated with square of a distance between the corresponding sensed region position and the reflective type PIR motion detection system.

In practical, the different strength of signal depends on location in the detection range of the organisms. Based on the above, in the reflective type PIR motion detection system according to the invention, the aperture width of each reflecting curved surface of the reflecting element is designed to be positively correlated with the reciprocal of the cosine value of the azimuth angle of the reflecting curved surface, and the aperture length of each reflecting curved surface of the reflecting element is designed to be positively correlated with the square of the distance between a corresponding infrared source and the reflective type PIR motion detection system. Accordingly, the reflecting curved surface having a larger azimuth angle and the reflecting curved surface for reflecting an infrared ray from a farther position may have a larger and appropriate aperture area. Thus, sensing capability of the reflective type PIR motion detection system is improved.

To make the above features and advantages of the invention more comprehensible, embodiments accompanied with drawings are described in detail as follows.

DETAILED DESCRIPTION OF DISCLOSED EMBODIMENTS

Figure 1:
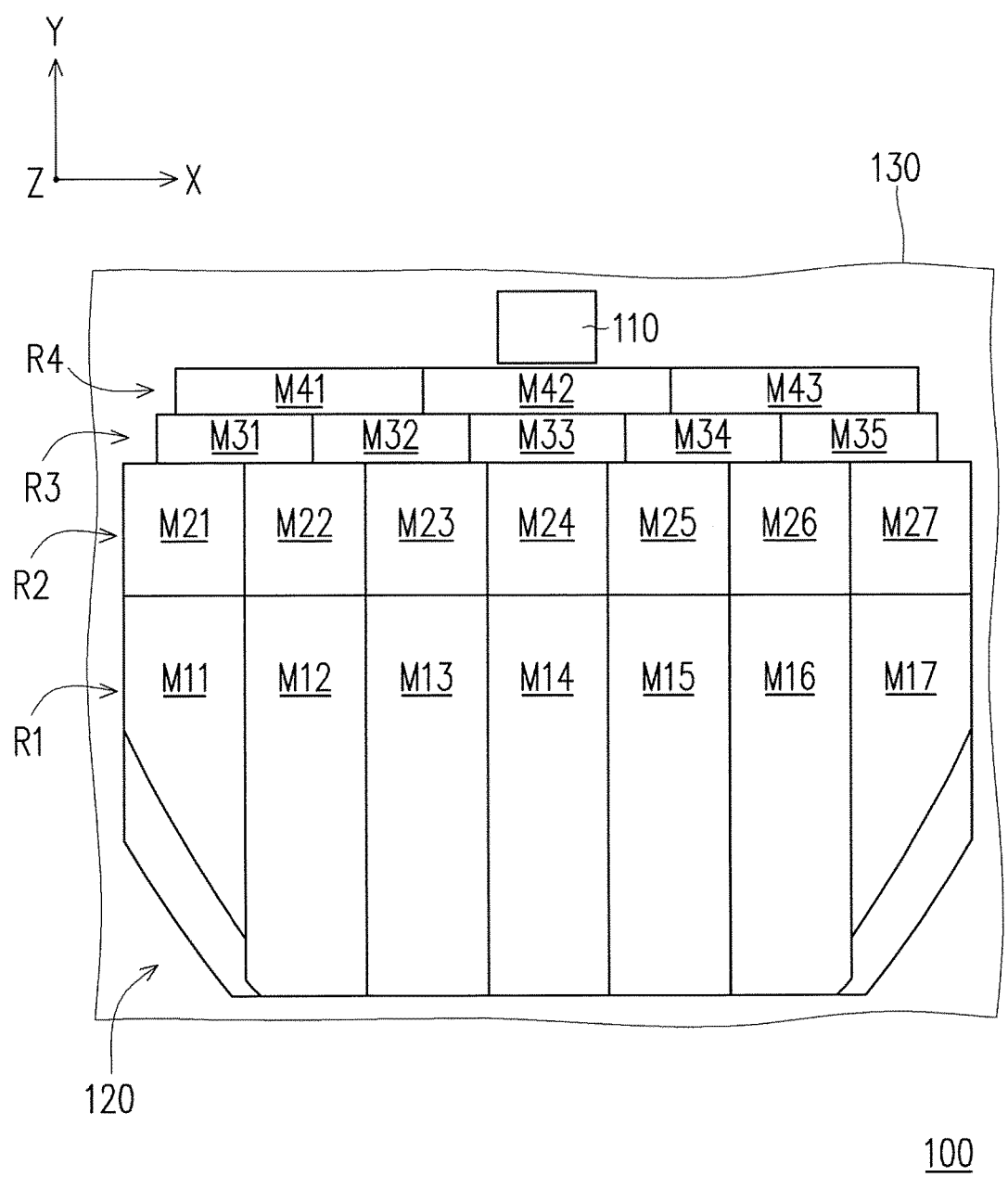
FIG. 1 is a front view of a reflective type passive infrared (PIR) motion detection system according to an embodiment of the invention.
Figure 2:
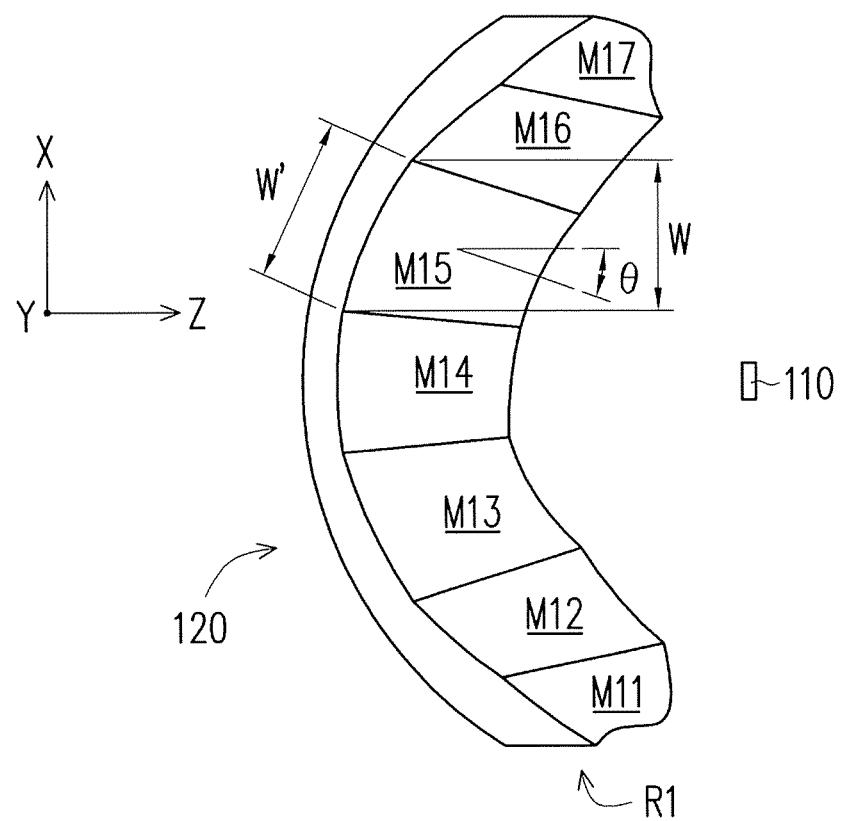
FIG. 2 is a top view of a partial structure of the reflective type PIR motion detection system in FIG. 1.
Figure 3:
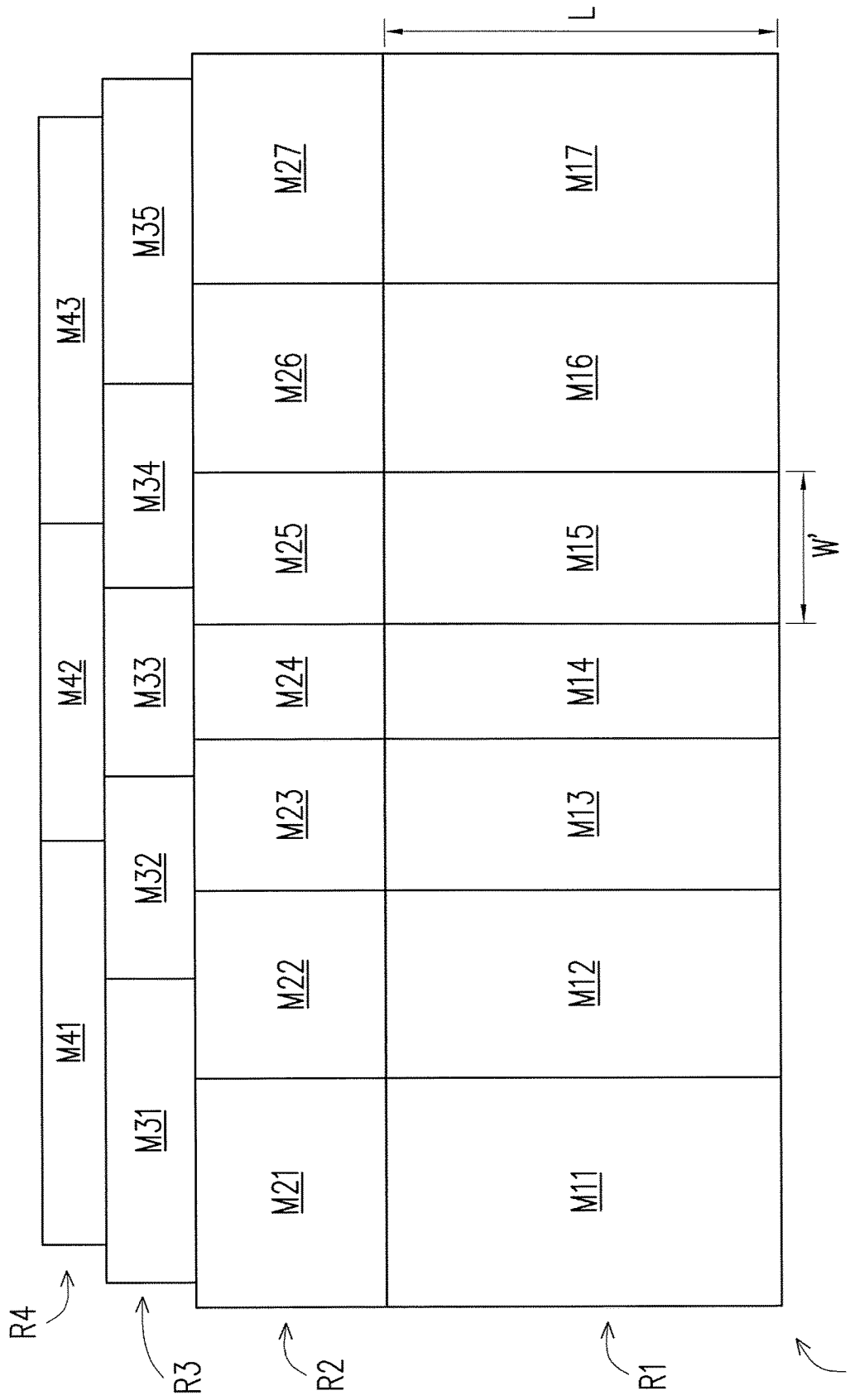
FIG. 3 illustrates a spread view of a reflecting element in FIG. 1 on an XY plane.

FIG. 1 is a front view of a reflective type passive infrared (PIR) motion detection system according to an embodiment of the invention. FIG. 2 is a top view of a partial structure of the reflective type PIR motion detection system in FIG. 1. FIG. 3 illustrates a spread view of a reflecting element in FIG. 1 on an XY plane, so as to indicate actual aperture length and aperture width of each reflecting curved surface. For clearer illustration, FIG. 2 only illustrates a sensor element 110 and a reflecting tier R1 in FIG. 1. Referring to FIG. 1 to FIG. 3, a reflective type PIR motion detection system 100 of the present embodiment includes the sensor element 110, a reflecting element 120 and a housing 130. The sensor element 110 is, for example, a dual-element pyro-electric infrared sensor or any other suitable type of sensor, and is disposed on the housing 130. The reflecting element 120 is disposed on the housing 130 and has a plurality of reflecting tiers (illustrated as but not limited to four reflecting tiers R1 to R4). The reflecting tiers R1 to R4 are arranged along a second axial direction Y in sequence.

The reflecting tier R1 has a plurality of reflecting curved surfaces (illustrated as but not limited to seven reflecting curved surfaces M11 to M17). The reflecting curved surfaces M11 to M17 are arranged along a first axial direction X in sequence and respectively have different azimuth angles relative to a third axial direction Z, wherein the second axial direction Y, the first axial direction X and the third axial direction Z are perpendicular to one another. Similarly, the reflecting tier R2 has a plurality of reflecting curved surfaces (illustrated as but not limited to seven reflecting curved surfaces M21 to M27). The reflecting curved surfaces M21 to M27 are arranged along the first axial direction X in sequence and respectively have different azimuth angles relative to the third axial direction Z. Similarly, the reflecting tier R3 has a plurality of reflecting curved surfaces (illustrated as but not limited to five reflecting curved surfaces M31 to M35). The reflecting curved surfaces M31 to M35 are arranged along the first axial direction X in sequence and respectively have different azimuth angles relative to the third axial direction Z. Similarly, the reflecting tier R4 has a plurality of reflecting curved surfaces (illustrated as but not limited to three reflecting curved surfaces M41 to M43). The reflecting curved surfaces M41 to M43 are arranged along the first axial direction X in sequence and respectively have different azimuth angles relative to the third axial direction Z.

Figure 4:
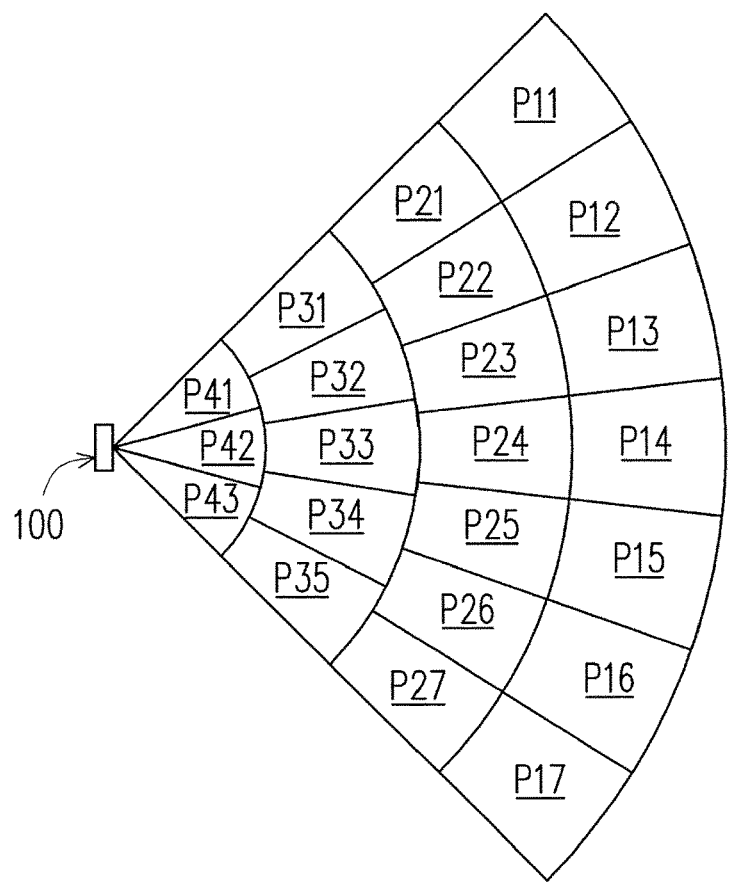
FIG. 4 illustrates sensed positions respectively corresponding to a plurality of reflecting curved surfaces in FIG. 1.

FIG. 4 illustrates sensed positions respectively corresponding to the reflecting curved surfaces in FIG. 1. The sensor element 110 as shown in FIG. 1 is disposed in the vicinity of a focal point of each reflecting curved surface. The reflecting curved surfaces M11 to M43 are, for example, all paraboloids and are adapted to respectively reflect infrared rays from different sensed positions P11 to P43 as shown in FIG. 4 onto the sensor element 110. That is, the sensed positions P11 to P43 respectively correspond to the reflecting curved surfaces M11 to M43. For example, when a person (or other object that emits infrared rays) moves to the sensed position P15, an infrared ray emitted from the person (or object) is reflected by the reflecting curved surface M15 of the reflecting element 120 onto the sensor element 110. Similarly, when a person (or other object that emits infrared rays) moves to another sensed position (one of the sensed positions P11 to P14 and P16 to P43), an infrared ray emitted from the person (or object) is reflected by the corresponding one of the reflecting curved surfaces M11 to M14 and M16 to M43 of the reflecting element 120 onto the sensor element 110.

Figure 5:
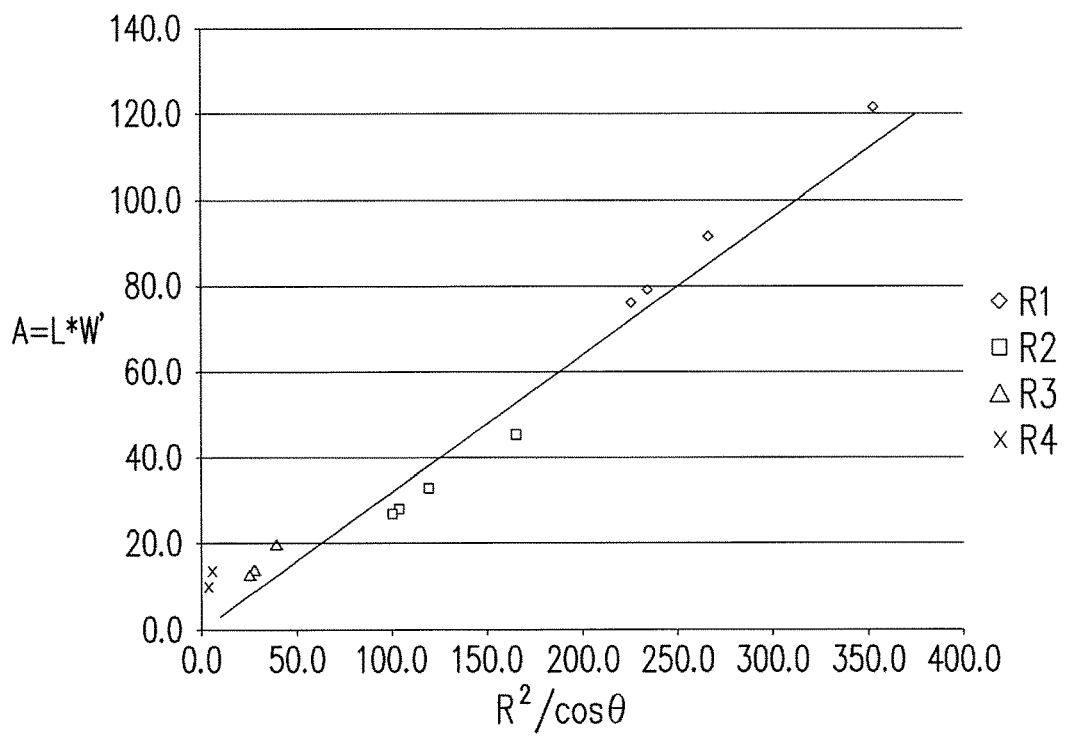
FIG. 5 illustrates a relationship between a light collecting area of each of the reflecting curved surfaces in FIG. 1 and $R^2/\cos \theta$.

In the present embodiment, an aperture length (an aperture length L of the reflecting curved surface M15 along a direction perpendicular to the first axial direction X is exemplarily labeled in FIG. 3; the aperture length herein refers to an actual straight length between a top edge and a bottom edge of each reflecting curved surface) of each reflecting curved surface (any one of the reflecting curved surfaces M11 to M43) along the direction perpendicular to the first axial direction X is positively correlated with square of a distance between the corresponding sensed position (the corresponding one among the sensed positions P11 to P43) and the reflective type PIR motion detection system 100. Specifically, the positive correlation mentioned above is, for example, direct proportionality, and may therefore be expressed as $L \propto R^2$, wherein R is defined as a distance between the corresponding sensed position and the reflective type PIR motion detection system 100. More specifically, the direct proportional relationship may be expressed as $L=K_1R^2$, wherein $K_1$ is a coefficient corresponding to the aperture length L of each reflecting curved surface in units of mm and the sensing distance R in units of m, and ranges from, for example, 0.05 to 0.3. In addition, an aperture width (an aperture width W of the reflecting curved surface M15 along the first axial direction X is exemplarily labeled in FIG. 2, and an aperture width W' of the reflecting curved surface M15 along a direction perpendicular to the second axial direction Y is exemplarily labeled in FIG. 2 and FIG. 3, wherein W' is obtained by dividing W by a cosine factor, i.e., $W'=W/\cos\theta$; the aperture width herein refers to an actual straight width between two opposite side edges of each reflecting curved surface) of each reflecting curved surface (any one of the reflecting curved surfaces M11 to M43) along the direction perpendicular to the second axial direction Y is positively correlated with a reciprocal of a cosine value of the corresponding azimuth angle (the azimuth angle θ of the reflecting curved surface M15 relative to the third axial direction Z is exemplarily labeled in FIG. 2). Specifically, the positive correlation mentioned above is, for example, direct proportionality, and may therefore be expressed as $W' \propto 1/\cos\theta$. More specifically, the direct proportional relationship may be expressed as $W'=K_2/\cos\theta$, wherein $K_2$ is a coefficient corresponding to the aperture width W' of each reflecting curved surface in units of mm, and ranges from, for example, 3.0 to 15.0. According to the above relational expressions, a light collecting area A (aperture area) of each reflecting curved surface may be expressed as $A=L*W'=K_3R^2/\cos\theta$, wherein $K_3$ is a coefficient corresponding to the light collecting area A of each reflecting curved surface in units of $mm^2$ and the sensing distance R in units of m, and ranges from 0.1 to 5.5. Based on the above, there is roughly a direct proportional relationship between the light collecting area A of each reflecting curved surface and $R^2/\cos\theta$, as shown in FIG. 5, and the slope of this relationship is $K_3$.

The table below specifically lists the aperture length L, the aperture width W' and the azimuth angle θ of each reflecting curved surface of the present embodiment.

| Reflecting curved surface | Aperture length (mm) | Aperture width (mm) | Azimuth angle (degree) |
|---|---|---|---|
| M11 | 15 | 7.2 | 47 |
| M12 | 15 | 5.7 | 31 |
| M13 | 15 | 5.0 | 15 |
| M14 | 15 | 4.8 | 0 |
| M15 | 15 | 5.0 | −15 |
| M16 | 15 | 5.7 | −31 |
| M17 | 15 | 7.2 | −47 |
| M21 | 5 | 7.2 | 47 |
| M22 | 5 | 5.7 | 31 |

-continued

| Reflecting curved surface | Aperture length (mm) | Aperture width (mm) | Azimuth angle (degree) |
|---|---|---|---|
| M23 | 5 | 5.0 | 15 |
| M24 | 5 | 4.8 | 0 |
| M25 | 5 | 5.0 | −15 |
| M26 | 5 | 5.7 | −31 |
| M27 | 5 | 7.2 | −47 |
| M31 | 2 | 9.1 | 45 |
| M32 | 2 | 6.9 | 21 |
| M33 | 2 | 6.4 | 0 |
| M34 | 2 | 6.9 | −21 |
| M35 | 2 | 9.1 | −45 |
| M41 | 1 | 13.3 | 41 |
| M42 | 1 | 10 | 0 |
| M43 | 1 | 13.3 | −41 |

Based on the design that "the aperture length of each reflecting curved surface along the direction perpendicular to the first axial direction is positively correlated with the square of the distance between the corresponding sensed position and the reflective type PIR motion detection system," since the distance between the sensed positions P11 to P17 and the reflective type PIR motion detection system 100 is the largest as shown in FIG. 4, the distance between the sensed positions P21 to P27 and the reflective type PIR motion detection system 100 is the second largest as shown in FIG. 4, the distance between the sensed positions P31 to P35 and the reflective type PIR motion detection system 100 is the third largest as shown in FIG. 4, and the distance between the sensed positions P41 to P43 and the reflective type PIR motion detection system 100 is the smallest as shown in FIG. 4, as shown in the above table, the aperture length (15 mm) of the reflecting curved surfaces M11 to M17 along the direction perpendicular to the first axial direction X is the largest, the aperture length (5 mm) of the reflecting curved surfaces M21 to M27 along the direction perpendicular to the first axial direction X is the second largest, the aperture length (2 mm) of the reflecting curved surfaces M31 to M35 along the direction perpendicular to the first axial direction X is the third largest, and the aperture length (1 mm) of the reflecting curved surfaces M41 to M43 along the direction perpendicular to the first axial direction X is the smallest.

In addition, based on the design that "the maxima width of each reflecting curved surface along the direction perpendicular to the second axial direction is positively correlated with the reciprocal of the cosine value of the corresponding azimuth angle," since in the reflecting tier R1, the absolute value (47 degrees) of the azimuth angle of the reflecting curved surfaces M11 and M17 relative to the third axial direction Z is the largest, the absolute value (31 degrees) of the azimuth angle of the reflecting curved surfaces M12 and M16 relative to the third axial direction Z is the second largest, the absolute value (15 degrees) of the azimuth angle of the reflecting curved surfaces M13 and M15 relative to the third axial direction Z is the third largest, and the absolute value (0 degree) of the azimuth angle of the reflecting curved surface M14 relative to the third axial direction Z is the smallest, as shown in the above table, in the reflecting tier R1, the aperture width of the reflecting curved surfaces M11 and M17 along the direction perpendicular to the second axial direction Y is the largest, the aperture width of the reflecting curved surfaces M12 and M16 along the direction perpendicular to the second axial direction Y is the second largest, the aperture width of the reflecting curved surfaces M13 and M15 along the direction perpendicular to the second axial direction Y is the third largest, and the aperture width of the reflecting curved surface M14 along the direction perpendicular to the second axial direction Y is the smallest. Similarly, in the reflecting tier R2, R3 or R4, as shown in the above table, there is a similar direct proportional relationship between the aperture width of the reflecting curved surface along the direction perpendicular to the second axial direction and the reciprocal of the cosine value of the corresponding azimuth angle.

Figure 6:
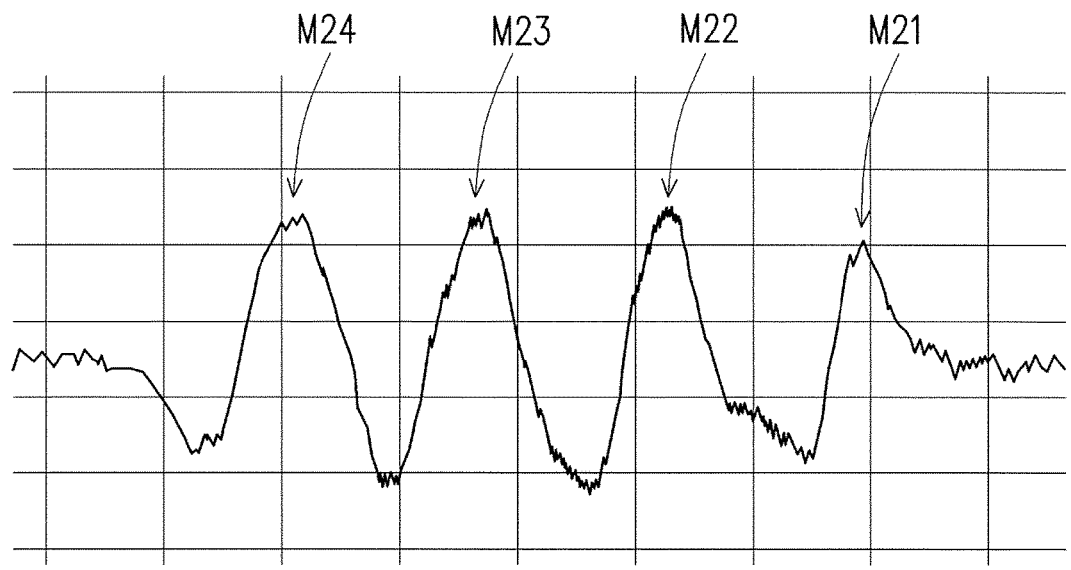
FIG. 6 illustrates sensing waveforms obtained by sensing motions of a human body at the same distance and different azimuth angles by a sensor element in FIG. 1.

By the above designs, the reflecting curved surface having a larger azimuth angle and the reflecting curved surface for reflecting an infrared ray from a farther position may have a larger and appropriate aperture area. Thus, sensing signals corresponding to different positions have similar strengths, thereby improving sensing capability of the reflective type PIR motion detection system 100. Specifically, from the sensing waveforms shown in FIG. 6 that are obtained by sensing the reflecting curved surfaces M21 to M24 at the same distance and different azimuth angles by the sensor element 110, it is known that the infrared rays reflected by the reflecting curved surfaces M21 to M24 onto the sensor element 110 have approximately equal irradiance, which means that the reflective type PIR motion detection system 100 of the present embodiment is effectively improved in the sensing capability for a farther infrared source.

As shown in FIG. 1, in the present embodiment, the farther the reflecting tier is from the sensing element 110, the larger the number of the reflecting curved surfaces of the reflecting tier is. Moreover, the farther the reflecting curved surface is from the sensing element 110, the larger the aperture area of the reflecting curved surface is. For example, the reflecting tier R4 closest to the sensor element 110 has only three reflecting curved surfaces M41 to M43, while the reflecting tier R1 farthest from the sensor element 110 has seven reflecting curved surfaces M11 to M17. Moreover, the aperture area of each of the reflecting curved surfaces M41 to M43 of the reflecting tier R4 closest to the sensor element 110 ranges from 10 mm$^2$ to 13.2 mm$^2$, while the aperture area of each of the reflecting curved surfaces M11 to M17 of the reflecting tier R1 farthest from the sensor element 110 ranges from 73.5 mm$^2$ to 107.7 mm$^2$. In addition, in the reflecting element 120 of the present embodiment, any two reflecting curved surfaces (e.g., the reflecting curved surfaces M15 and M16) adjacent to each other are not continuous, as shown in FIG. 2. However, the invention is not limited to the above arrangement manner.

Figure 7:
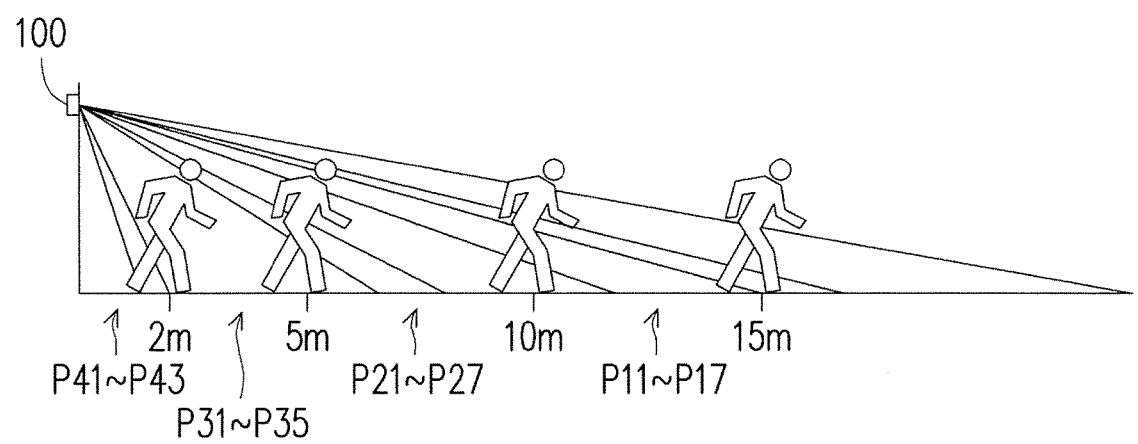
FIG. 7 illustrates actual distances between the positions shown in FIG. 4 and the reflective type PIR motion detection system.

In addition, the invention also does not limit the actual distances between the sensed positions P11 to P43 as shown in FIG. 4 and the reflective type PIR motion detection system 100. FIG. 7 illustrates actual distances between the sensed positions shown in FIG. 4 and the reflective type PIR motion detection system. The distance between the sensed positions P11 to P17 corresponding to the reflecting tier R1 and the reflective type PIR motion detection system 100 is, for example but not limited to, 15 in as shown in FIG. 7; the distance between the sensed positions P21 to P27 corresponding to the reflecting tier R2 and the reflective type PIR motion detection system 100 is, for example but not limited to, 10 m as shown in FIG. 7; the distance between the sensed positions P31 to P35 corresponding to the reflecting tier R3 and the reflective type PIR motion detection system 100 is, for example but not limited to, 5 m as shown in FIG. 7; and the distance between the sensed positions P41 to P43 corresponding to the reflecting tier R4 and the reflective type PIR motion detection system 100 is, for example but not limited to, 2 m as shown in FIG. 7.

In summary, in the reflective type PIR motion detection system of the invention, the aperture width of each reflecting curved surface of the reflecting element is designed to be positively correlated with the reciprocal of the cosine value of the azimuth angle of the reflecting curved surface, and the aperture length of each reflecting curved surface of the reflecting element is designed to be positively correlated with the square of the distance between the corresponding infrared source and the reflective type PIR motion detection system. Accordingly, the reflecting curved surface having a larger azimuth angle and the reflecting curved surface for reflecting an infrared ray from a farther position may have a larger and appropriate aperture area. In this way, even if the azimuth angle of the reflecting curved surface is large or the distance of the infrared source is far, the infrared ray can be effectively and sufficiently reflected onto the sensor element. Thus, sensing signals corresponding to different positions have similar strengths, thereby improving sensing capability of the reflective type PIR motion detection system.

Although the invention has been described with reference to the embodiments thereof, it will be apparent to one of the ordinary skills in the art that modifications to the described embodiments may be made without departing from the spirit of the invention. Accordingly, the scope of the invention will be defined by the attached claims not by the above detailed description.

What is claimed is:

1. A reflective type passive infrared (PIR) motion detection system, comprising:
    a housing;
    a sensor element disposed on the housing; and
    a reflecting element disposed on the housing and having a plurality of reflecting tiers, wherein each of the reflecting tiers has a plurality of reflecting curved surfaces, the reflecting curved surfaces are arranged along a first axial direction in sequence, the reflecting tiers are arranged along a second axial direction in sequence, and the reflecting curved surfaces in each of the reflecting tiers respectively have different azimuth angles relative to a third axial direction and are adapted to respectively reflect infrared rays from different sensed positions onto the sensor element, wherein
    an aperture width of each of the reflecting curved surfaces along a direction perpendicular to the second axial direction is positively correlated with a reciprocal of a cosine value of the corresponding azimuth angle.

2. The reflective type PIR motion detection system according to claim 1, wherein an aperture length of each of the reflecting curved surfaces along a direction perpendicular to the first axial direction is positively correlated with square of a distance between the corresponding sensed position and the reflecting element.

3. The reflective type PIR motion detection system according to claim 2, wherein the aperture length of each of the reflecting curved surfaces along the direction perpendicular to the first axial direction is in direct proportion to the square of the distance between the corresponding sensed position and the reflecting element, and the aperture width of each of the reflecting curved surfaces along the direction perpendicular to the second axial direction is in direct proportion to the reciprocal of the cosine value of the corresponding azimuth angle.

4. The reflective type PIR motion detection system according to claim 1, wherein the first axial direction, the second axial direction and the third axial direction are perpendicular to one another, any two of the reflecting curved surfaces adjacent to each other are not continuous, each of the reflecting curved surfaces is a paraboloid, the farther the reflecting tier is from the sensing element, the larger the number of the reflecting curved surfaces of the reflecting tier is, and the farther the reflecting curved surface is from the sensing element, the larger the aperture area of the reflecting curved surface is.

5. The reflective type PIR motion detection system according to claim 1, wherein an aperture area of each of the reflecting curved surfaces of the reflecting tier closest to the sensor element is 10 mm$^2$ to 13.2 mm$^2$, and the aperture area of each of the reflecting curved surfaces of the reflecting tier farthest from the sensor element ranges from 73.5 mm$^2$ to 107.7 mm$^2$.

6. The reflective type PIR motion detection system according to claim 1, wherein the sensor element is a dual-element pyro-electric infrared sensor.

7. A reflective type passive infrared (PIR) motion detection system, comprising:
    a housing;
    a sensor element disposed on the housing; and
    a reflecting element disposed on the housing and having a plurality of reflecting tiers, wherein each of the reflecting tiers has a plurality of reflecting curved surfaces, the reflecting curved surfaces are arranged along a first axial direction in sequence, the reflecting tiers are arranged along a second axial direction in sequence, and the reflecting curved surfaces in each of the reflecting tiers respectively have different azimuth angles relative to a third axial direction and are adapted to respectively reflect infrared rays from different sensed positions onto the sensor element, wherein
    an aperture length of each of the reflecting curved surfaces along a direction perpendicular to the first axial direction is positively correlated with square of a distance between the corresponding sensed position and the reflecting element.

8. The reflective type PIR motion detection system according to claim 7, wherein the aperture length of each of the reflecting curved surfaces along the direction perpendicular to the first axial direction is in direct proportion to the square of the distance between the corresponding sensed position and the reflecting element.

9. The reflective type PIR motion detection system according to claim 7, wherein the first axial direction, the second axial direction and the third axial direction are perpendicular to one another, any two of the reflecting curved surfaces adjacent to each other are not continuous, each of the reflecting curved surfaces is a paraboloid, the farther the reflecting tier is from the sensing element, larger the number of the reflecting curved surfaces of the reflecting tier is, and the farther the reflecting curved surface is from the sensing element, the larger the aperture area of the reflecting curved surface is.

10. The reflective type PIR motion detection system according to claim 7, wherein an aperture area of each of the reflecting curved surfaces of the reflecting tier closest to the sensor element is 10 mm$^2$ to 13.2 mm$^2$, and the aperture area of each of the reflecting curved surfaces of the reflecting tier farthest from the sensor element ranges from 73.5 mm$^2$ to 107.7 mm$^2$.

11. The reflective type PIR motion detection system according to claim 7, wherein the sensor element is a dual-element pyro-electric infrared sensor.

* * * * *